Figure 1:
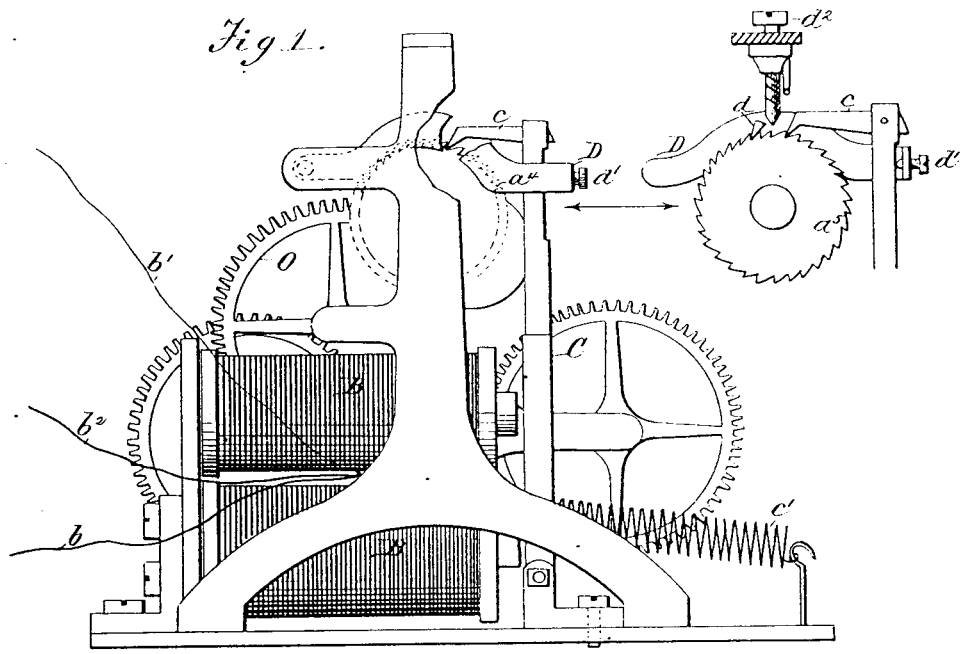
Figure 2:
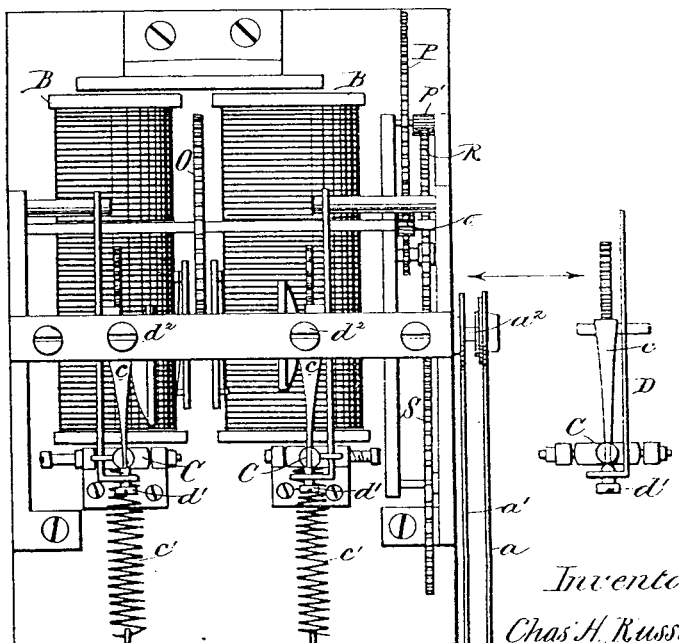

2 Sheets--Sheet 1.

C. H. RUSSELL & J. SAX.
Electrical Billiard-Register.

No. 164,661. Patented June 22, 1875.

Witnesses:
Harry C. Clark
James J. Finley

Inventors:
Chas. H. Russell
and
Julius Sax
By H. Beadle &c.
Attys.

THE GRAPHIC CO. PHOTO-LITH. 39 & 41 PARK PLACE, N.Y.

2 Sheets—Sheet 2.
C. H. RUSSELL & J. SAX.
Electrical Billiard-Register.
No. 164,661. Patented June 22, 1875.
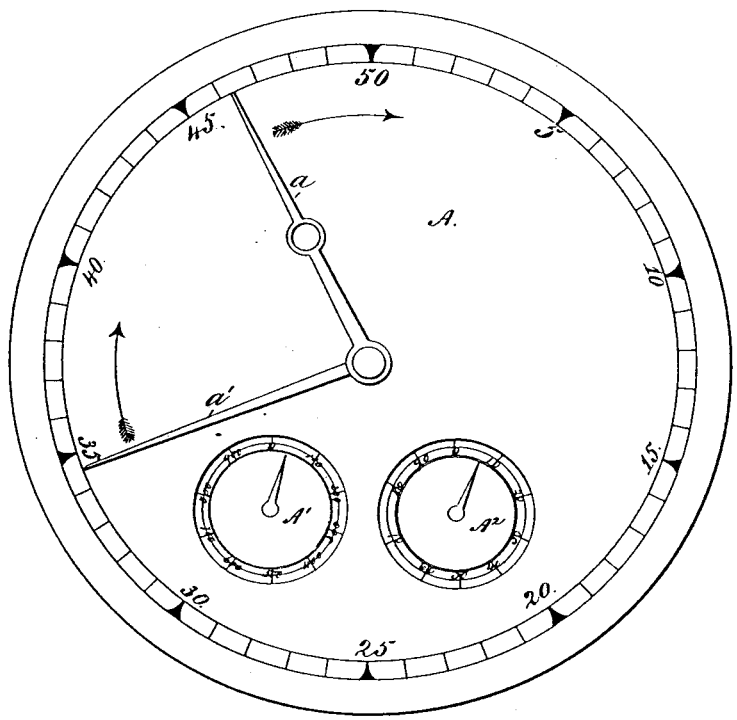
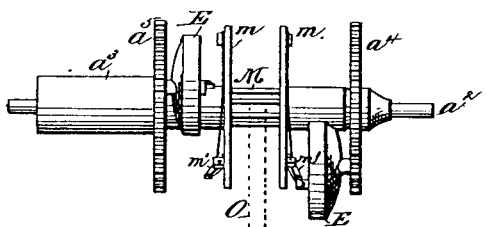
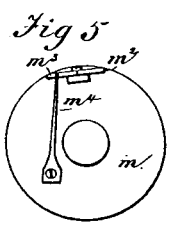
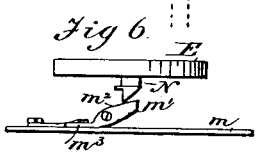
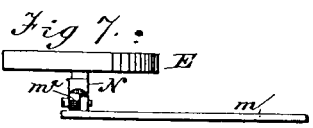
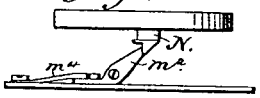
Witnesses;
Harry C. Clark
James J. Finley
Inventors.
Chas' H. Russell
and
Julius Sax.
By H. W. Beadle & Co.
Att'ys.

UNITED STATES PATENT OFFICE.

CHARLES H. RUSSELL AND JULIUS SAX, OF LONDON, ENGLAND, ASSIGNORS TO BERNHARD AHRENS, OF SAME PLACE.

IMPROVEMENT IN ELECTRICAL BILLIARD-REGISTERS.

Specification forming part of Letters Patent No. 164,661, dated June 22, 1875; application filed June 20, 1873.

*To all whom it may concern:*

Be it known that we, CHARLES HENRY RUSSELL and JULIUS SAX, both of London, England, have invented certain Improvements in Billiard-Registers, of which the following is a specification:

This invention relates to that class of billiard-registers in which electricity is employed to actuate the indicating-machinery; and it consists, mainly, first, in the combination of armatures carrying driving levers or pushes, with certain independent gearing and the indicating-pointers; second, in the combination of certain mechanism for indicating the points made in the game, with certain mechanism for recording the number of games; it consists, further, in certain specific details of construction, which, in connection with the foregoing, will be fully described hereinafter.

A represents a dial, adapted, by suitable divisions and numbers, to indicate, in connection with the index-hands, the points made in a game. $A^1 A^2$ represent dials, adapted to record the number of games played. $a\ a^1$ represent the pointers, marked in a suitable manner to distinguish them from each other, and to identify one of them with each ball. $a^2$ represents the shaft of the pointer or index-hand $a$, which, extending behind the dial into a suitable case or box, is held in proper bearings and provided with a gear-wheel, $a^4$, as shown. $a^3$ represents a sleeve or cylinder inclosing shaft $a$, and carrying the pointer $a^1$, which is provided with a similar gear-wheel, $a^5$, as shown. B B represent electric magnetic coils, attached to a battery, (not shown,) and $b\ b$, main wires, extending to certain actuating-knobs in the frame of the billiard-table, and $b^2$ a return wire for completing the circuit. C C represent armatures, pivoted at the lower ends to the base-plate of the case, and each provided above with a driving lever or pusher, $c$, the moving end of which is adapted to engage with the teeth of the gear-wheel $a^4$ or $a^5$, and give motion thereto. $c'\ c'$ represent springs, by means of which a proper return-movement is given to the armatures. D D represent bars, each of which is pivoted at one end to a proper supporting-arm, and provided with a stud or stop, $d$, adapted in position and form to engage with the teeth of gear-wheel $a^4$ or $a^5$, and to prevent any backward movement of the same. $d^1$ represents a set-screw, held in the bent end of the bar D, which is adapted, by adjustment, to determine the limit of the rearward movement of the armature-lever. $d^2$ represents a set-screw, located above the gear-wheels $a^4\ a^5$, and provided with a beveled end, which is adapted, by adjustment, to determine the limit of the forward movement of the armature-lever. E represents a weight, connected with the shaft of each pointer, which is adapted to keep them fixed in any position in which they may be moved.

The foregoing description relates to the medium for indicating the points made in a single game, and its operation is substantially as follows:

When any one of the players at the table depresses the knob identified with his ball, the electrical circuit is made complete, and consequently the connected magnet is attracted by its armature, and actuates, by means of its pusher or driving-lever, the gear-wheel attached to the shaft of the proper pointer, which latter is, of course, consequently moved upon the dial.

The operation of each half of the apparatus is the same, one being identified with the plain ball, and the other with the spot-ball.

For the purpose of indicating the number of games played, the following mechanism is employed:

M represents a pinion, loose upon the main shaft, which is provided at each end with a disk, $m$, as shown. $m^1\ m^1$ represent pivoted stops, located upon the outer faces of the disks $m$, which is provided with an inclined portion, $m^2$, and a horizontal arm, $m^3$, as shown. $m^4$ represents a spring, adapted to bear upon the horizontal arm $m^3$ of the stop, and hold the same in place. N represents a stud, attached directly or indirectly to the gear-wheel of the index-hand, which is provided upon each side with an inclined face, and adapted in position and size to come in contact, in its revolution, with the stops $m^1$, and give them revolution. O represents a gear-wheel, engaging with pinion M, the shaft of which is provided, also, with a pinion, o, engaging with a gear-wheel, P, the shaft of which carries an index-hand in front of a small recording-dial, as shown.

By means of a pinion, $p'$, and gear-wheels R R S, the revolutions of the index-hand of the first recording-dial are recorded upon a second, and, if desired, they may be indicated, also, upon a third.

The operation of the game-recording mechanism is as follows: At every complete revolution of either pointer the disk M at once revolves, and this revolution, by means of the intermediate gearing and pinions, causes the recording index-hand to move but one space, the gearing being arranged to reduce or diminish the movement in the manner well understood.

As the pointers and their attached gear-wheels are moved independently of each other, it will sometimes occur that the movement of one will force the stop of the opposite disk past the stud attached to the gearing of the pointer, which is stationary. This result is accomplished without injury, as the stop is adapted to pass on the inside face of the stud when moving backward against it, by means of it.

The construction described is quite simple, and yet effective for the purpose designed.

Having thus fully described our invention, what we claim as new, and desire to secure by Letters Patent, is—

1. The combination of the armature-levers C C, the intermediate gearing $a^4$ $a^5$, and the index-hands, substantially as described.

2. The combination of the armature-levers, the intermediate gearing, and the index-hands, with the game-recording mechanism, consisting, essentially, of the loose pulley M with its disks and stops, the intermediate gearing, and the recording dial and index, as described.

3. The combination of the pusher-lever C, and the stop $d^1$ for limiting its backward movement, as described.

4. The combination of the pusher-lever C, and the stop $d^2$ for limiting its forward movement, substantially as described.

5. The combination of the pusher-lever C, and the stops $d^1$ $d^2$ for limiting its forward and backward movement.

6. The combination of the index-hands $a^1$ $a^2$, and the gearing $a^4$ $a^5$, having the weight E, as described.

7. The combination of the studs N, the spring-stops $m^1$, the loose pinion M, and the connecting-gearing, as described.

C. H. RUSSELL.
JULIUS SAX.

Witnesses:
E. DE PASS,
    68 *Fleet Street, London.*
HENRY HARDEN,
    316 *Regent Street,* W.